US011056135B1

(12) United States Patent
Peng

(10) Patent No.: US 11,056,135 B1
(45) Date of Patent: Jul. 6, 2021

(54) HEAT-ASSISTED RECORDING HEAD WITH ONE OR MORE SURFACE-PLASMONIC PLATES OPERABLE AS A NEAR-FIELD TRANSDUCER

(71) Applicant: Seagate Technology LLC, Cupertino, CA (US)

(72) Inventor: Chubing Peng, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/861,459

(22) Filed: Apr. 29, 2020

Related U.S. Application Data

(60) Provisional application No. 62/840,951, filed on Apr. 30, 2019.

(51) Int. Cl.
| | |
|---|---|
| *G11B 5/31* | (2006.01) |
| *G11B 5/60* | (2006.01) |
| *G11B 5/706* | (2006.01) |
| *G11B 13/08* | (2006.01) |
| *G11B 5/00* | (2006.01) |

(52) U.S. Cl.
CPC ............ *G11B 5/314* (2013.01); *G11B 5/3116* (2013.01); *G11B 5/6088* (2013.01); *G11B 5/70605* (2013.01); *G11B 13/08* (2013.01); *G11B 2005/0021* (2013.01)

(58) Field of Classification Search
CPC ...... G11B 5/314; G11B 5/3116; G11B 5/6088
USPC ........................................... 360/125.3–125.5
See application file for complete search history.

(56) References Cited

U.S. PATENT DOCUMENTS

| | | | |
|---|---|---|---|
| 8,320,220 B1 | 11/2012 | Yuan et al. | |
| 9,728,209 B2 | 8/2017 | Chen et al. | |
| 9,786,304 B1 | 10/2017 | Tanner et al. | |
| 10,770,098 B1 * | 9/2020 | Peng | G11B 5/4866 |
| 10,811,035 B1 * | 10/2020 | Lee | G11B 5/6088 |
| 10,811,038 B1 * | 10/2020 | Peng | G11B 5/1878 |

OTHER PUBLICATIONS

Peng, U.S. Appl. No. 16/591,999, filed Oct. 3, 2019.

* cited by examiner

*Primary Examiner* — Allen T Cao
(74) *Attorney, Agent, or Firm* — Mueting Raasch Group

(57) ABSTRACT

A recording head includes a dielectric waveguide that extends towards a media-facing surface of the recording head. A hybrid waveguide is near the media-facing surface and includes the dielectric waveguide and a heat spreader plate having a crosstrack dimension that is at least twice that of a core of the dielectric waveguide. The hybrid waveguide is operable to combine a total internal reflection of the dielectric waveguide with a surface plasmon confinement of the heat spreading plate to excite TM-even mode in the hybrid waveguide. A surface-plasmonic plate is in contact with the heat spreader plate, the second surface-plasmonic plate has a peg extending from an enlarged portion. Light energy from the TM-even mode propagating from the hybrid waveguide to the surface-plasmonic plate causes the surface plasmonic plate to focus the light energy to heat a recording medium.

20 Claims, 7 Drawing Sheets

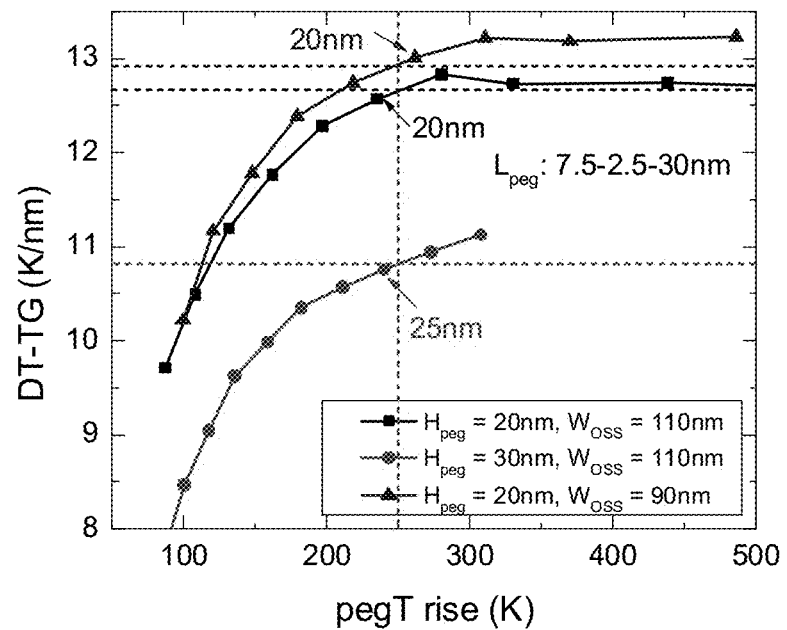
FIG. 12
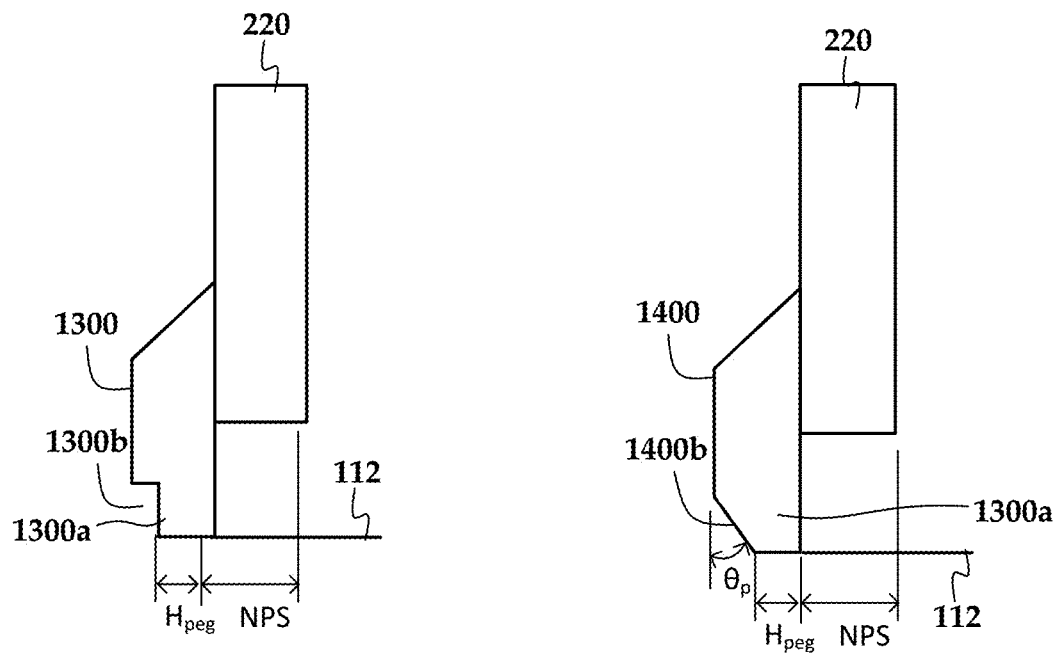
FIG. 13
FIG. 14

HEAT-ASSISTED RECORDING HEAD WITH ONE OR MORE SURFACE-PLASMONIC PLATES OPERABLE AS A NEAR-FIELD TRANSDUCER

RELATED PATENT APPLICATIONS

This application claims the benefit of Provisional Patent Application Ser. No. 62/840,951 filed on Apr. 30, 2019, which is hereby incorporated herein by reference in its entirety.

SUMMARY

The present disclosure is directed to a heat-assisted magnetic recording head with one or more surface-plasmonic plates operable as a near-field transducer. In one embodiment, a recording head includes a dielectric waveguide that extends towards a media-facing surface of the recording head. A hybrid waveguide is near the media-facing surface and includes the dielectric waveguide and a heat spreader plate having a crosstrack dimension that is at least twice that of a core of the dielectric waveguide. The hybrid waveguide is operable to combine a total internal reflection of the dielectric waveguide with a surface plasmon confinement of the heat spreading plate to excite TM-even mode in the hybrid waveguide. A surface-plasmonic plate is in contact with the heat spreader plate, the second surface-plasmonic plate has a peg extending from an enlarged portion. Light energy from the TM-even mode propagating from the hybrid waveguide to the surface-plasmonic plate causes the surface plasmonic plate to focus the light energy to heat a recording medium.

In another embodiment, a recording head includes a waveguide core and a magnetic pole. A first surface-plasmonic plate is proximate the magnetic pole and recessed from a media-facing surface of the write head. A bottom surface of the first surface-plasmonic plate faces away from the magnetic pole and towards the waveguide core. The first surface-plasmonic plate is formed of a first material having lower-loss in plasmonic coupling than a second material. The second material is more mechanically robust than the first material. A second surface-plasmonic plate is formed of the second material and located on the bottom surface of the first surface-plasmonic plate. The second surface-plasmonic plate has a peg extending from an enlarged portion. The peg extends closer to the media-facing surface than the first surface-plasmonic plate. An upper edge of the second surface-plasmonic plate is slanted in a downtrack direction.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 10, 11, and 12 are graphs showing a simulation of the configurations shown in FIGS. 8 and 9;

FIGS. 13 and 14 are close up views of near-field transducers according to additional embodiments;

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

For enhanced reliability, currently employed NFTs may use a hybrid Au—Rh bilayer, for instance. The NFT includes a resonator body made of a low plasmonic loss Au plate, which faces a waveguide core and interacts with a fundamental transverse magnetic mode ($TM_{00}$), or, a first higher order transverse electric mode ($TE_{10}$). Above the Au plate, a mechanically robust Rh-plate with a protruded peg is deposited. The Rh-plate generates a hot spot in a recording media for heat-sink assisted magnetic recording (HAMR). Note that the Rh layer has high plasmonic loss and low thermal conductivity.

This Au—Rh arrangement maximizes the coupling to the dielectric waveguide and minimizes the interaction of Rh with light. The bottom Au resonator also provides heat-sinking to the protruded Rh peg, as the NFT heat-sink above the Rh plate is usually recessed from the Au/Rh plate for high thermal gradient. Surface plasmon polaritons (SPP) are generated at the bottom surface (facing the waveguide core) of the Au resonator if $TM_{00}$ mode excitation or near the bottom periphery of the side of the Au resonator if $TE_{10}$ mode excitation. However, this SPP in either case does not efficiently couple to the Rh peg. To enhance this coupling, the Au resonator (and therefore the Rh plate) is tapered down toward a media-facing surface, pushing the SPP upward to the Rh peg. This narrowing taper may resulting in increasing bottom Au recess from the media-facing surface, a concern for reliability.

In embodiments described below, a near-field transducer has a mechanically robust but high loss plasmonic material directly facing a waveguide core. This robust surface-plasmonic plate with a protruded peg is attached on the bottom of a low-loss plasmonic plate, slanted along down-track direction at the start, and much shorter than the low-loss plasmonic plate. The low-loss plasmonic plate is recessed from media facing surface. The NFT does not have a low-loss plasmonic plate underneath and therefore, no potential risk of recess. To obtain high thermal gradient, the cross-section area of robust plasmonic plate at the media-facing surface becomes smaller. As a result, the heat removal from the protruded peg may become more problematic. This disclosure describes features that can reduce this temperature rise in an NFT using a high plasmonic loss material.

Figure 1:
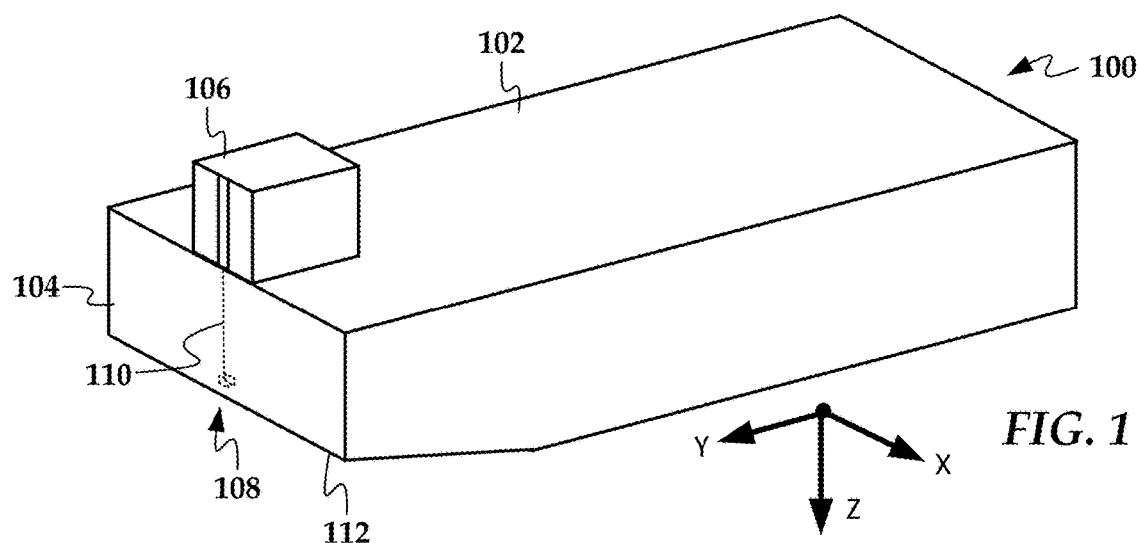
FIG. 1 is a perspective view of a slider assembly according to an example embodiment.

In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/write transducers 108 at a trailing edge 104 that are held proximate to a surface of a magnetic recording medium (not shown), e.g., a magnetic disk.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
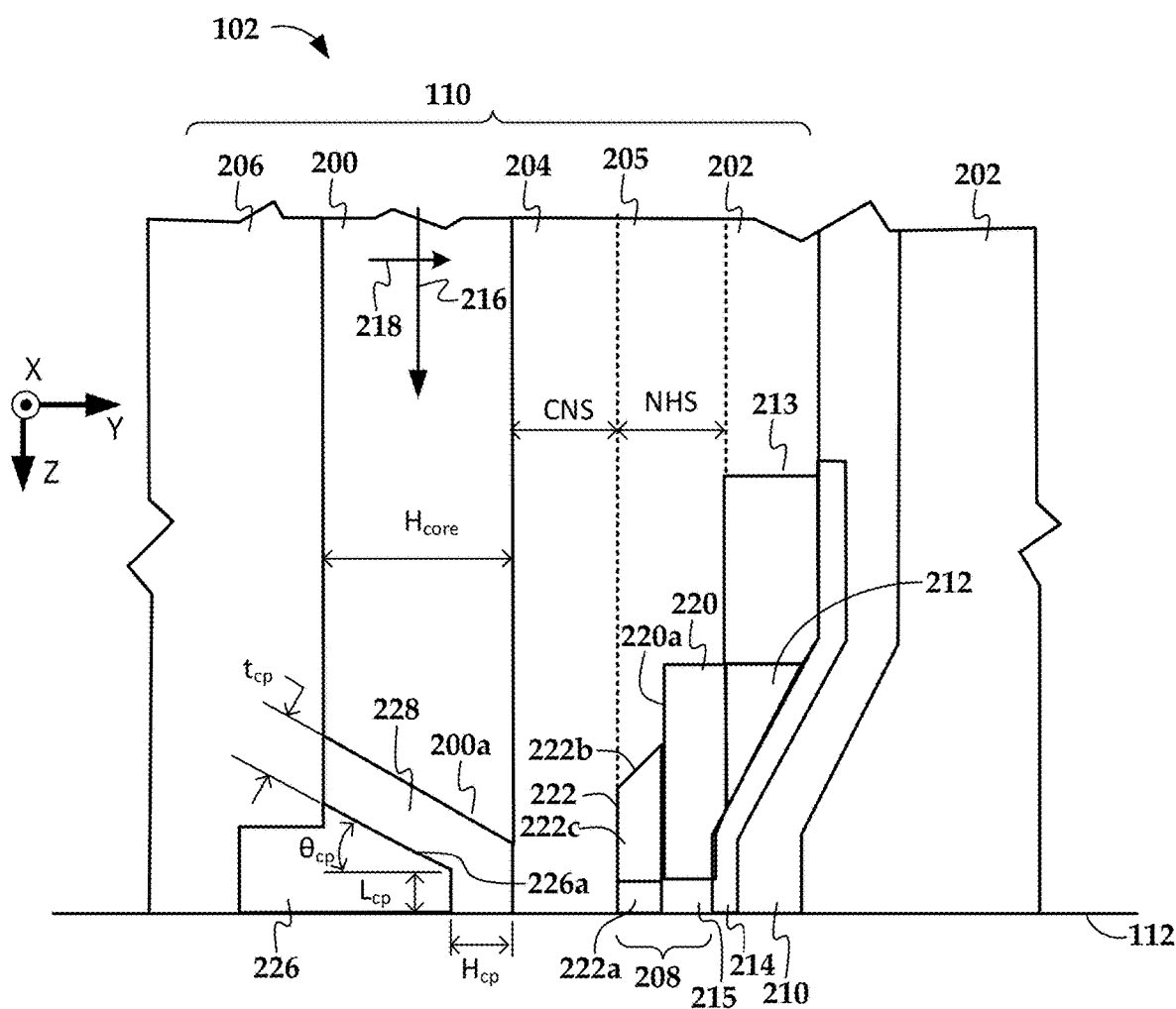
FIG. 2 is a cross-sectional view of a slider along a down-track plane according to according to an example embodiment.
Figure 3:
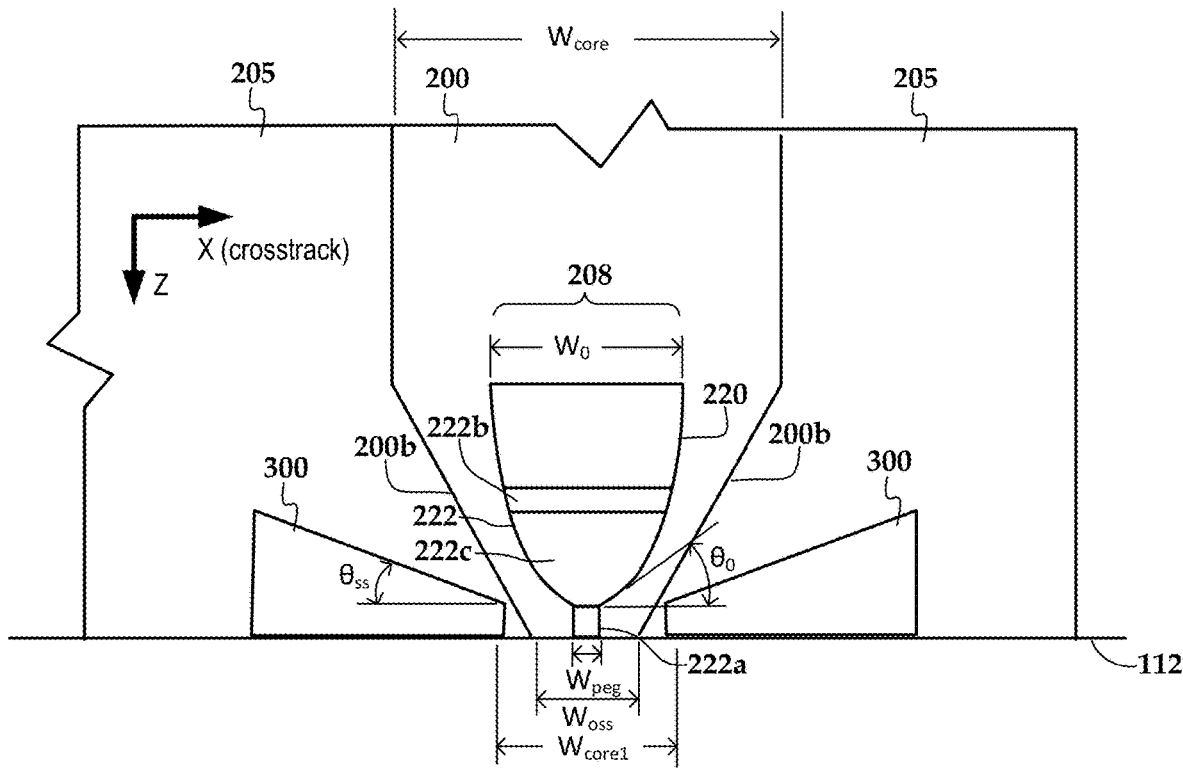
FIG. 3 is a wafer plane view of a slider according to an example embodiment.
Figure 4:
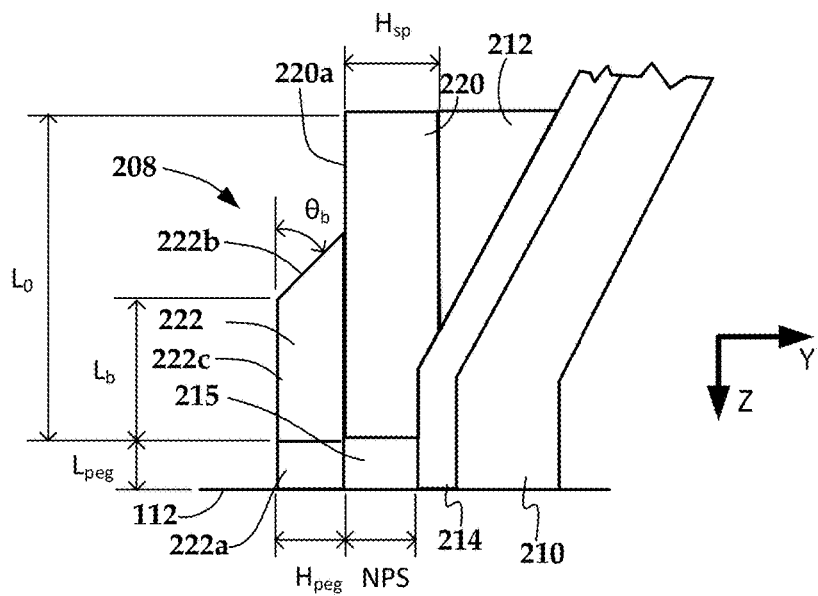
FIG. 4 is a close up view of the near-field transducer shown in FIGS. 2 and 3.

In FIGS. 2, 3, and 4 cross-sectional views show details of a slider body 102 according to an example embodiment. As best seen in FIG. 2, the waveguide 110 includes a core 200, top cladding layer 202, middle cladding layers 204, 205, and bottom cladding 206. The core 200 delivers light to an NFT 208 that is located within the middle cladding layer 204 at the media-facing surface 112. A write pole 210 (also referred to herein as a "magnetic pole") is located near the NFT 208. A heat sink 212 thermally couples the NFT 208 to the write pole 210, and a heat spreading plate 213 further diffuses heat. The heat spreading plate 213 could be separated from the write pole 210 by a dielectric material. A diffusion barrier 214 is shown between the heat sink 212 and the write pole 210. A magnetic coil (not shown) induces a magnetic field through the write pole 210 in response to an applied current. During recording, the NFT 208 forms a hotspot within a recording layer of a moving recording medium (not shown). The write pole 210 sets a magnetic orientation in the hotspot, thereby writing data to the recording medium.

In this configuration, waveguide 110 is a three-dimensional dielectric waveguide that delivers light 216 with a fundamental transverse magnetic mode ($TM_{00}$) propagating along the waveguide core 200. The electric field is indicated by arrow 218. The NFT 208 includes a first surface-plasmonic plate 220 proximate the magnetic pole 210 and recessed from the media-facing surface 112. A bottom surface 220a of the first surface-plasmonic plate faces away from the magnetic pole 210 and towards the waveguide core 200. The first surface-plasmonic plate 220 is formed of a first material such as Au, Ag, Cu, and alloys thereof, which have lower-loss in plasmonic coupling than a second material used to form such a second surface-plasmonic plate 222. Relative to the first material, the second material is more mechanically robust, but has higher plasmonic loss, lower Q-factor, and lower thermal conductivity. The second material may include Rh, Ir, Pt, Pd, and alloys thereof, in addition to metal nitrides (e.g., TiN, ZrN, TaN), graphene, etc.

The second surface-plasmonic plate 222 is located on the bottom surface 220a of the first surface-plasmonic plate 220 and has a peg 222a that extends from an enlarged portion 222c towards the media-facing surface. The peg 222a extends closer to the media-facing surface 112 than the first surface-plasmonic plate 220. An upper edge 222b of the second surface-plasmonic plate 222 slants in a downtrack direction. Generally, the second surface-plasmonic plate 222 is smaller in the z-direction (normal to the recording media) than the first surface-plasmonic plate 220, e.g., about one-sixth of the z-dimension, not counting the peg 222a.

Light absorption in the NFT 208, in particular, in the second surface-plasmonic plate 222, raises the local temperature. To maximize the heat transfer from the second surface plasmon plate 222 to the first surface-plasmonic plate 220, the large portion 222c of the second surface plasmon plate 222 follows the in-plane shape (a projected on the substrate-parallel plane x-z) of the first surface-plasmonic plate 220, as best seen in FIG. 3. The media-facing-edge of the in-plane crosstrack shapes may be curves such as a parabolas, circular sections, etc. In other embodiments, the in-plane shapes may be one or more straight lines (e.g., trapezoidal/arrow shape, rectangular, piecewise linear). Both plates 220, 222 have a slow narrowing near the end, or a small $\theta_0$. The first surface-plasmonic plate 220, on one hand, couples light from the dielectric waveguide for NFT efficiency, and also provides heat-sinking to the second surface plasmon plate 222 as well as a heat-sink path to the magnetic pole 210 and the heat-spreading plate 213.

The recording head may also include first and second optical side shields 300 on first and second crosstrack sides of the first and second surface-plasmonic plates 220, 200. The first and second optical side shields 300 are elongated and slanted relative to the media-facing surface 112 in a crosstrack direction. Also seen in this view are crosstrack tapered sides 200b of the waveguide core 200.

In reference again to FIG. 2, the slider body 102 may include a funnel coupler 226 that has a reflective surface 226a facing and separated from a downtrack-slanted surface 200a of the core 200 by a dielectric spacer 228. The funnel coupler 226 is made of a metallic material, such as a low-loss plasmonic material (such as Au), a high-loss plasmonic material (such as Rh, Ir, Pt), and a lossy refractory metal (such as Ru). The material of the funnel coupler 226 can be chosen based on a desired reliability target. To reduce the light absorption in the metal of the funnel coupler 226, a thin dielectric material of index of refraction lower than the waveguide core material, such as $SiO_2$ and $Al_2O_3$, may be used as the spacer 228. Due to the nature of metal and the $TM_{00}$ mode used for NFT excitation, light could be further squeezed to the NFT 208 for excitation via the funnel coupler 226.

Figure 5:
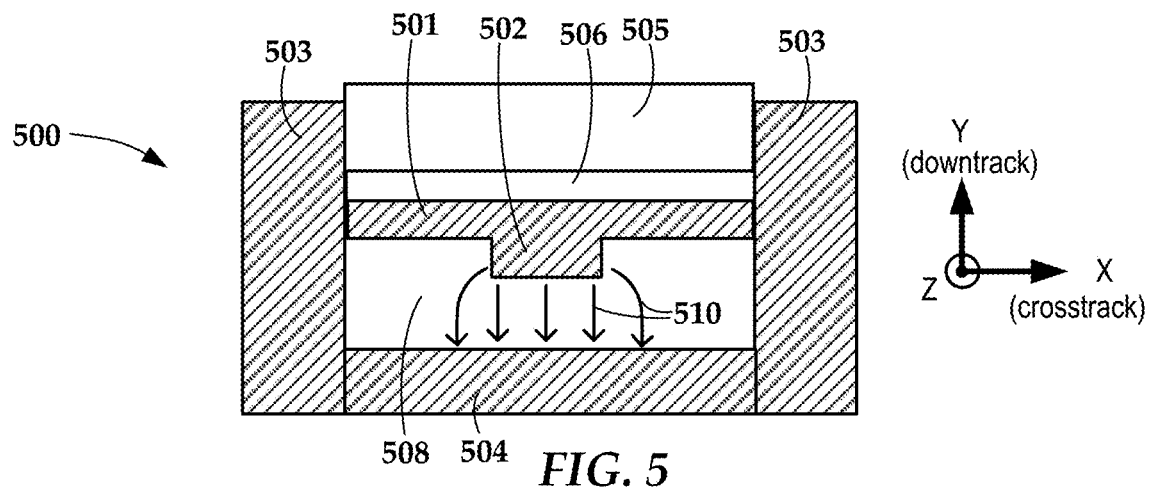
FIGS. 5, 6, and 7 are cross-sectional views of an aperture waveguide according to example embodiments.
Figure 6:
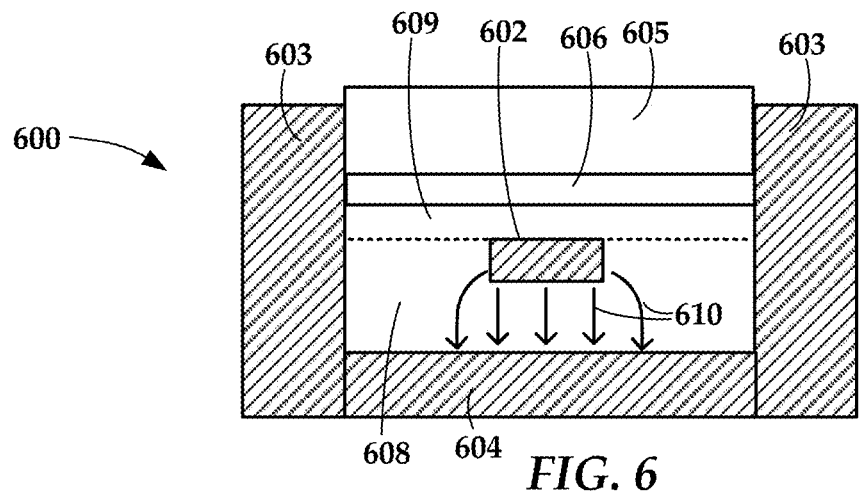
Figure 7:
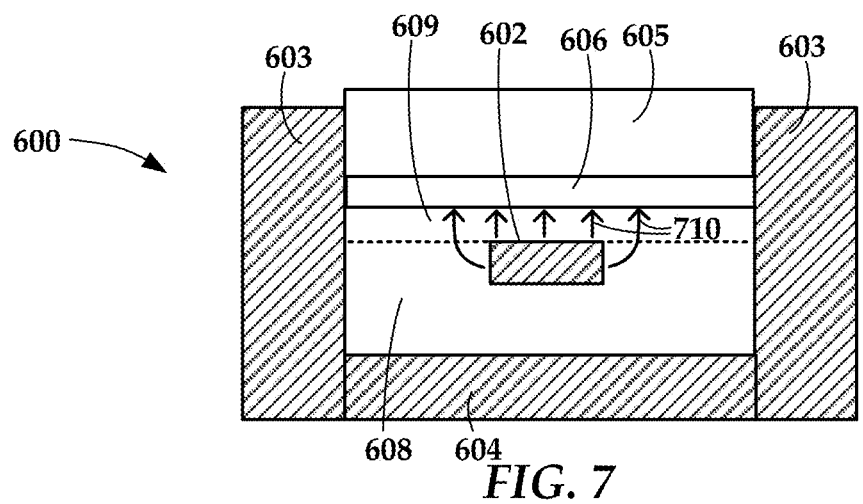

In order to better understand the operation of the NFT 208, FIGS. 5-7 various ridge transducer configurations according to example embodiments. In microwaves, a ridge waveguide is used as a transmission line. Due to its extended cut-off in wavelength and field confinement, it can also be used as a near-field transducer (NFT) for heat-assisted magnetic recording (HAMR) in near-infrared frequencies, referred to as C-aperture, E-antenna, coaxial aperture, etc.

In FIG. 5, a cross-sectional view shows a C-aperture waveguide 500 having a base part 501 with a ridge 502, surrounded by side metal portions 503 and a bottom metal portion 504 to form an aperture 508. The waveguide 500 is shown near a magnetic pole 505 and separated therefrom by a diffusion barrier 506. The aperture 508 is filled with a dielectric material. Electric field lines 510 are shown extending from the ridge 502 to the bottom metal portion 504. Generally, an NFT may have this C-aperture configuration away from the media-facing surface, being replaced by a configuration as shown in FIGS. 6 and 7 at or near the media-facing surface.

In FIGS. 6 and 7, a near-field transducer 600 has a similar configuration as what is shown in FIG. 5, except that a dielectric 609 (also referred to herein as "NPS") separates ridge 602 from magnetic pole 605 and diffusion barrier 606. Even though they are given different reference numbers in FIGS. 6 and 7, these structures may be extensions of what is shown in FIG. 5 but closer to the media-facing surface. This dielectric regions 609 replaces the metallic base near the media-facing surface. For reliable operation, this dielectric regions 609 extend a short distance in the away from the media-facing surface in the z-direction so that the base (e.g., base 501 located away from the media-facing surface) can dissipate the Joule heat generated in the ridge 602, in particular, near the end of ridge 602. Dielectric region 608 separates the ridge 602 from the bottom metal portion 604.

The fundamental mode of a C-aperture is a transverse magnetic, $TM_{00}$, with the dominated electric field along y-direction, $E_y$, and concentrated in the ridge-bottom metal gap, as shown by electric field lines 510 in FIG. 5. The longitudinal field component, $E_z$, from the ridge normal to media-facing surface, is much weaker than the transverse component, $E_y$, due to the spreading of the electric charges to the base. Current storage media, which uses metallic material for heat-sink, prefers a longitudinal field component, due to the effect of image charges in the media. To confine the charges to the ridge, dielectric layer 609 is used to separate the ridge 602 from the base near the media-facing surface, as shown in FIGS. 6 and 7, resulting in $E_z > E_y$, and therefore, greater thermal gradient (TG). As indicated by the electric field lines 610, 710, the $E_y$ component in FIG. 6 is substantially between the ridge 602 and bottom metal 604 and in FIG. 7 is between the ridge 602 and diffusion barrier 606 and magnetic pole 605.

In FIGS. 6 and 7, the protruded ridge 602, often referred to as a peg, is thermally isolated from the base by the dielectric NPS. Light absorption in the peg will result in substantial temperature rise, which is not preferred in drive operation. To control this temperature rise, the peg or the dielectric NPS from the media facing surface into the aperture along z-direction should be short. It has been found that there are two basic configurations that are appropriate for an NFT using this configuration. In FIG. 6, the peg length ($L_{peg}$) is 10-30 nm, and the $E_y$ component is still concentrated between the peg 602 and the bottom metal 604, which is used in this configuration.

In reference again to FIGS. 2-4, the first surface-plasmonic plate 220 is directly above the second surface-plasmonic plate 222 and has no (or small, for instance, <10 nm) recess from the large portion of the second surface-plasmonic plate 222 (along negative z-direction). Both surface-plasmonic plates 220, 222 become narrower toward the media-facing surface 112, having wide width, for instance, $W_0$ for the first surface-plasmonic plate 220, to a narrow end, for instance, $W_{peg}$, for the second surface-plasmonic plate 222. The funnel coupler 226, formed in the waveguide core 200, further squeezes the waveguide mode to the NFT 208, increasing the NFT excitation efficiency. The funnel coupler 226 functions as the bottom metal in the C-aperture as seen in FIGS. 5-7. The optical side shield 300 functions as the side metals of the C-aperture. The distance between the peg and the funnel coupler, $CNS+H_{cp}$ (see FIG. 4), is optimized for NFT efficiency, in the same way as the C-aperture. Particular cases include $H_{cp}=0$, and/or $t_{cp}=0$. A flat top in the funnel coupler, $L_{cp}$, is preferred to utilize Fabry-Perot resonance for NFT efficiency.

Evanescent coupling from the dielectric waveguide to the near-field transducer generates surface-plasmon polaritons (SPP) at the bottom surfaces of both surface-plasmonic plates 220, 222. The first surface-plasmonic plate 220 is much longer than the second surface-plasmonic plate 222, $L_0 \gg L_b$. It has a high Q-factor, efficiently coupled to the dielectric waveguide. The SPP generated from the first surface-plasmonic plate 220 propagates to the second surface-plasmonic plate 222 through a slanted edge 222b in the second surface-plasmonic plate 222. A shallow slant angle ($\theta_b$) mitigates the SPP scattering and reflection loss. The length ($L_b$) of second surface-plasmonic plate 222 is chosen to be as short as possible and both surface-plasmonic plates 220, 222 are phase-matched for efficiency.

The mechanically robust second surface-plasmonic plate 222, such as Rh, Ir, Pt, Pd, usually has low thermal conductivity. In the configuration of FIGS. 2-4, modeling showed that the second surface-plasmonic plate 222 is required to be very thin, for instance, $H_{peg} < 30$ nm, to yield the desired thermal gradient for high storage density. Even through the large $E_y$ field at the gap between peg and bottom metal relieves some absorption in the peg, it is still preferable to dissipate the heat generated in the peg of second surface-plasmonic plate 222. For this purpose, the first surface-plasmonic plate 220 may be removed such that the second surface-plasmonic plate 222 is directly attached to the heat-spreading plate 213 (or the heat-sink 212), which is connected to the magnetic pole 210 for heat dissipation.

Figure 8:
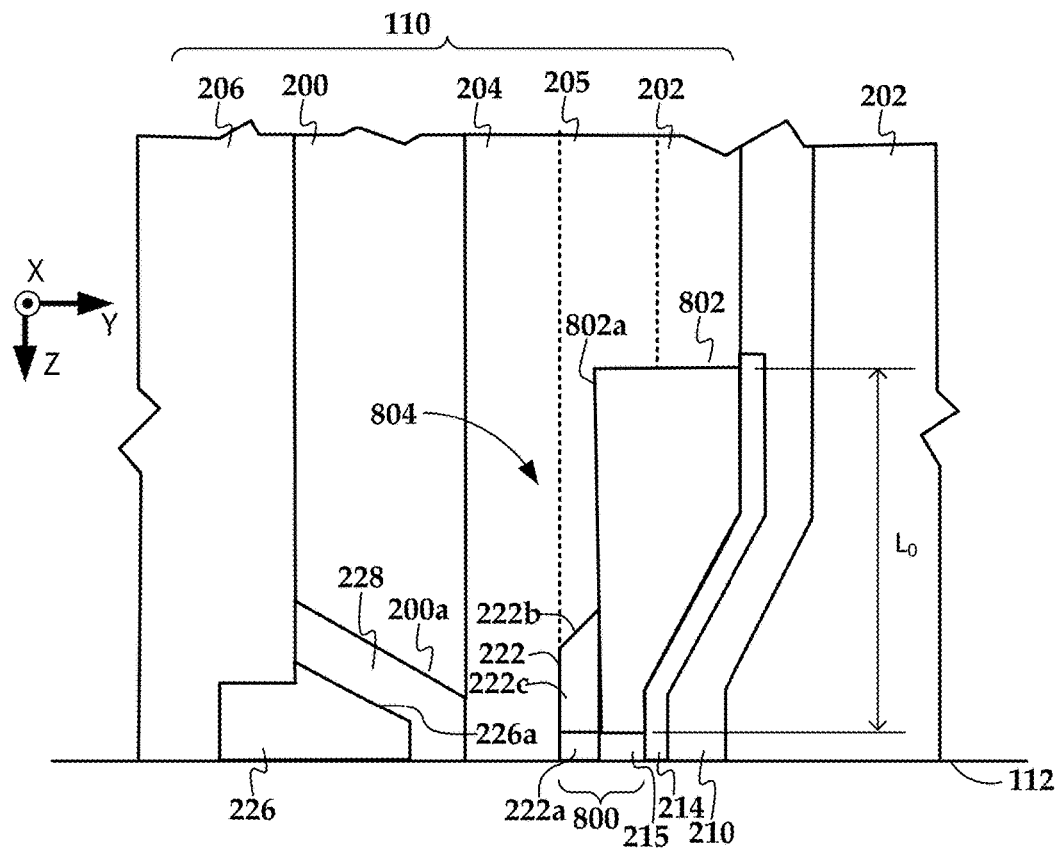
FIGS. 8 and 9 are views of a hybrid waveguide and near-field transducer according to an example embodiment.
Figure 9:
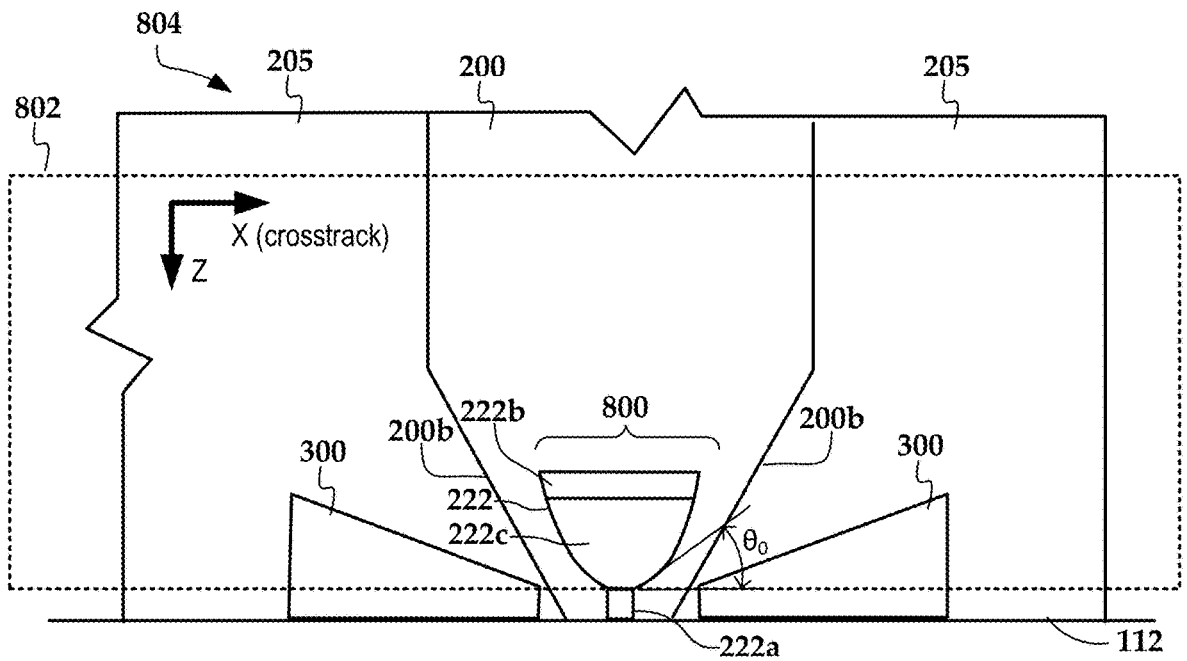

The cross-sectional views of FIGS. 8 and 9 show an NFT 800 using this configuration without a first surface-plasmonic plate. The same reference numbers in FIGS. 2-4 are used to indicate like components in FIGS. 8 and 9, except as otherwise noted. A heat-spreading plate 802 is made of a low-loss plasmonic material, such as Au, Ag, Cu, Au-alloys. It is very wide along cross-track direction and $L_0$ long along the z-direction. This is similar to the heat-spreading plate 213 shown in FIG. 2, except with a different geometry and also acts as a heat sink as it directly contacts the NFT 800. The heat-spreading plate 802 has no recess (or small, <10 nm) from the large portion 222c of the second surface-plasmonic plate 222. The plate dimension $L_0$ is determined for maximizing coupling efficiency from the dielectric waveguide to the NFT, minimizing the temperature rise at the peg, and sometimes, for minimal back reflection.

Physically, the heat-spreading plate 802, the waveguide core 200, and the low index layers in-between (the middle cladding layers 204, 205 in FIG. 8) form a hybrid plasmonic waveguide 804. A dielectric waveguide uses total internal reflection to confine light in a high index core region. It can guide light over a long distance with very low loss, but its light confinement is limited by diffraction.

The heat-spreading plate 802, on the other hand, supports surface plasmon propagation to confine light near the bottom surface 802a in the down-track direction normal to the metal surface. The light confinement ability of the heat-spreading plate 802 is not limited by diffraction. However, the heat-spreading plate 802 suffers significant propagation loss because of the presence of the metal as part of the guiding structure. The hybrid plasmonic waveguide 804 combines the two different wave guiding schemes and achieves high light confinement along the down-track direction by the heat-spreading plate 802 without suffering large loss. The light confinement along the cross-track direction is provided by the dielectric core 200 width.

The incident mode $TM_{00}$ (the electric field is $E_y$ dominated) in the isolated dielectric waveguide will excite two gap plasmonic modes, e.g., TM-even ($TM_{00}$) and TM-odd ($TM_{01}$) mode, in the corresponding hybrid waveguide. Note that the TM-odd mode may be at cut-off if there is a small core cross section. The excitation of the TM-even mode is much stronger than that of the TM-odd mode, and the mode beating between the two gap plasmonic modes is weak.

Decreasing the cross-section of the dielectric core by, for instance, narrowing in the core width by tapering 200b and/or reducing the core thickness, will cut off the TM-odd mode, which will also push the TM-even mode into the gap (between the metal and core) if the cross-sectional area of the core is above certain threshold. Narrowing of the second surface-plasmonic plate 222 toward the media-facing surface along the cross-track direction performs plasmonic nanofocusing. The funnel coupler 226 will squeeze the field (of the TM-even mode) residing in the dielectric core onto the NFT to improve the NFT efficiency.

As an example, consider a waveguide formed of a $Ta_2O_5$ core with index of refraction n=2.09, $Al_2O_3$ of n=1.63 as the bottom cladding 206, side cladding (not shown), top cladding 202 and dielectric spacer 215 and $SiO_2$ of n=1.46 as the middle cladding layers 204, 205, and the dielectric spacer 228 between the core and the funnel coupler. The waveguide core 200 is 600-nm wide (along cross-track direction, $W_{core}$), and 400 nm thick (along down-track direction, $H_{core}$). Light wavelength λ=808 nm. The material for the first surface-plasmonic plate 220 and the heat-spreading layer 802 is gold, n=0.19+j 5.39. The material for the second surface-plasmonic plate 222 and the funnel coupler is Rh, n=2.72+j 6.85. It is assumed that the thermal conductivity is 56 W/m/K for the Rh and 195 W/m/K for Au. The diffusion barrier 214 between the magnetic pole 210 and the heat spreading plate 802 uses a 10-nm thick Ir material, n=3.43+j 6.

In this example, the configuration shown in FIG. 8 is used, although the dimensions referenced below can be found in FIGS. 2-4. The first surface-plasmonic plate 220 is removed and the second surface-plasmonic plate 222 (Rh) is directly in contact with the heat-spreading plate (Au) 802. The second surface-plasmonic plate 222 has a parabolic-like in-plane shape and is 200-nm wide at the start, $L_b$=160 nm, and $θ_0$=10°. The slant angle $θ_b$ of the second surface-plasmonic plate 222 is set at 60° for easier fabrication. The peg is $W_{peg}$=30 nm wide. The funnel coupler 226 is: $θ_{cp}$=45°, $H_{cp}$=20 nm, $t_{cp}$=15 nm and Lcp=Lpeg. The second surface-plasmonic plate 222 is CNS=20 nm from the core. The dielectric spacer between the peg of the second surface-plasmonic plate 222 and the Ir diffusion barrier is NPS=45 nm. The optical side shield (OSS) also uses Rh material and its opening at media-facing surface is $W_{OSS}$=110 nm and $θ_{oss}$=25°. The waveguide core is tapered down to $W_{core1}$=90 nm at the media-facing surface.

The media-facing surface 112 is coated with a 1-nm thick $Ta_2O_5$ layer and 2.7-nm thick a SiOx layer. The storage media includes a 2.8-nm thick carbon-overcoat layer, a 12-nm thick FePt recording layer, a 11-nm thick interlayer, a heat-sink layer, and a soft magnetic layer on a glass substrate. The air gap between head and media is 1 nm. The storage media is spinning at a linear velocity of 18.7 m/s.

Figure 10:
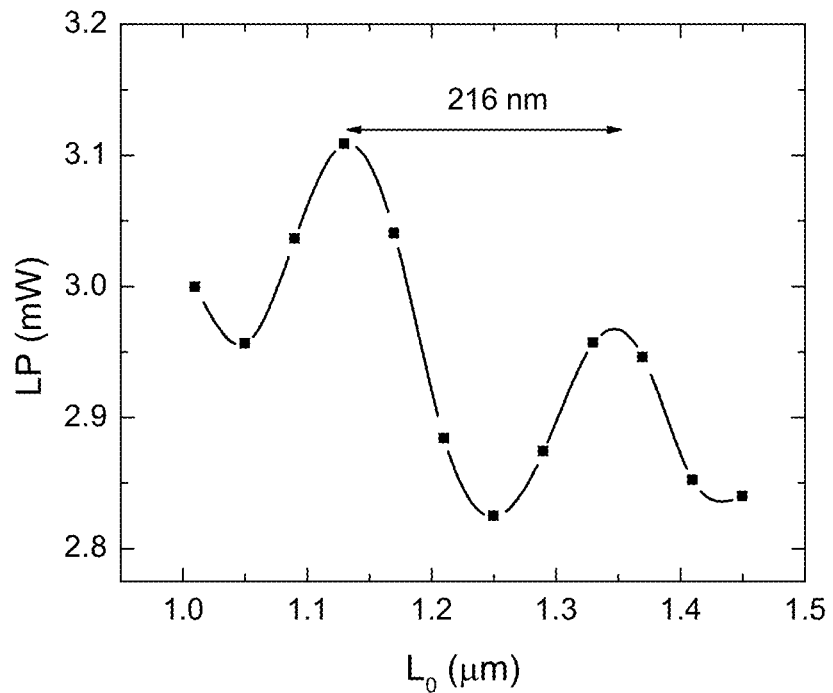
Figure 11:
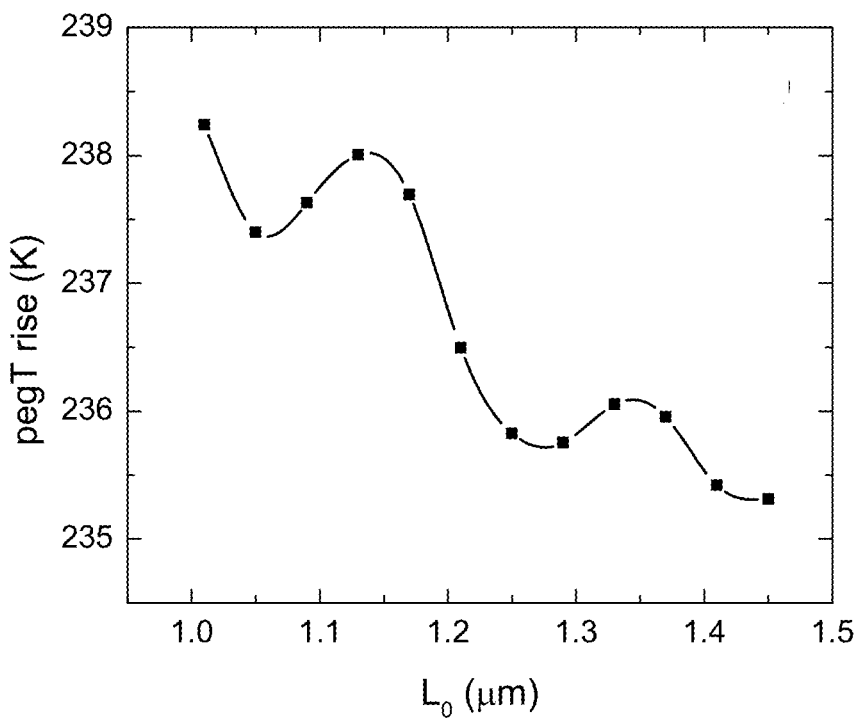

To demonstrate the mode beating between the dielectric mode and the SPP mode in the hybrid plasmonic waveguide, the graph in FIG. 10 shows the laser power (LP) needed to write a 38-nm wide track as a function of the heat-spreading plate length, $L_0$. The graph in FIG. 11 plots the induced temperature rise from light absorption at the end of peg. Oscillatory behavior in LP versus $L_0$ comes from the Fabry-Perot resonance. The LP reaches a global minimum at $L_0$=1.25 μm, a compromise between the coupling of the dielectric-waveguide to the hybrid plasmonic waveguide and light absorption in the heat-spreading plate 802. The induced temperature rise at the peg end also follows the oscillatory behavior of the LP but it keeps decreasing as $L_0$ increases in the range studied. This means the heat-sink capability overrides the LP.

The graph in FIG. 12 shows the thermal gradient along down-track, DT-TG, versus peg temperature (pegT) rise as the peg length scans from 7.5 nm to 30 nm by steps of 2.5 nm. It is evident that the DT-TG is very sensitive to peg thickness ($H_{peg}$). For reliability, pegT rise <250K is required. Micro-magnetic modeling shows that DT-TG>12 K/nm is preferred. This means that $H_{peg}$=20 nm or thinner is preferred.

For HAMR, it is also preferred that the hot spot is close to the magnetic pole for reasons that gain magnetic field strength and mitigate skew impact. In reference again to the configuration of FIG. 2 and also FIG. 6, there is strong $E_y$ field in the ridge/peg 222a—bottom metal gap/funnel coupler 226 and the hot spot is the location near the bottom of the ridge. Also see FIG. 7, where the $E_y$ field moves up to the dielectric gap 215 between the ridge/peg 222a and the diffusion barrier/magnetic pole if the first surface-plasmonic plate 220 (as well as the heat-sink and the heat-spreading layer) is appropriately recessed from the large portion of the second surface-plasmonic plate 222.

To those metals above the second surface-plasmonic plate 222, $E_y$ is tangential and will be zero at the interface between the dielectric gap 215 and these metals. The peg 222a is usually short, determined by the impedance match between NFT 800 and media as well as the induced temperature rise. Without recessing these metals from the second surface-plasmonic plate 222, it can be difficult to move the $E_y$ component into the dielectric gap 215. Moreover, to prevent the field in the ridge-bottom metal gap, the bottom metal (e.g., funnel coupler 226) is usually moved down to further away from the ridge than shown in FIG. 3. The bottom metal in this configuration is not a necessary component. It generally functions as a waveguide mode blocker to mitigate the thermal background in the storage media. The funnel coupler 226 in the waveguide core could squeeze the field in the dielectric core 200 to the NFT 800, increasing the NFT efficiency.

If the metals above the second surface-plasmonic plate 222, such as the first surface-plasmonic plate 220, the NFT heat-sink 212 (if used) and the heat-spreading layer 213, is recessed from the second surface-plasmonic plate 222, plus the reduction in the cross-sectional area of the peg 222a at the media-facing surface for high storage density, the induced temperature rise in the peg 222a is significant, a concern for reliable operation. In FIGS. 13 and 14, diagrams shows two configurations to control this temperature rise. In FIG. 13, a second surface-plasmonic plate 1300 includes an undercut (or notch) 1300b in the peg 1300a that provides a reduced downtrack thickness facing the media-facing surface 112. In FIG. 14, a second surface-plasmonic plate 1400 includes a bevel 1400b on the peg 1400a that provides a reduced downtrack thickness. Both configurations use a first surface-plasmon plate 220 as previously described, although may be used without such a plate, e.g., as shown in FIGS. 8 and 9. These configurations form a desired peg of small cross-section area at the media-facing surface while maximizing the heat transfer from the peg to the metals above the second surface-plasmonic plate 1300, 1400.

Modeling shows that the optimal thickness of the first surface-plasmonic plate 220, $H_{sp}$, is compromise of NFT efficiency, thermal gradient, and temperature rise at the peg. To effectively dissipate the heat from the second surface-plasmonic plate to the heat-spreading layer and the magnetic pole, the first surface-plasmonic plate 220 is not preferred.

For the thermal gradient, the first surface-plasmonic plate 220 is preferred. A good choice is: $H_{sp} \geq NPS$. To ease the fabrication, the first surface-plasmonic plate 220 might be removed, similar to FIGS. 8 and 9. There will be a small penalty in the thermal gradient at the same temperature rise of the peg.

Figure 15:
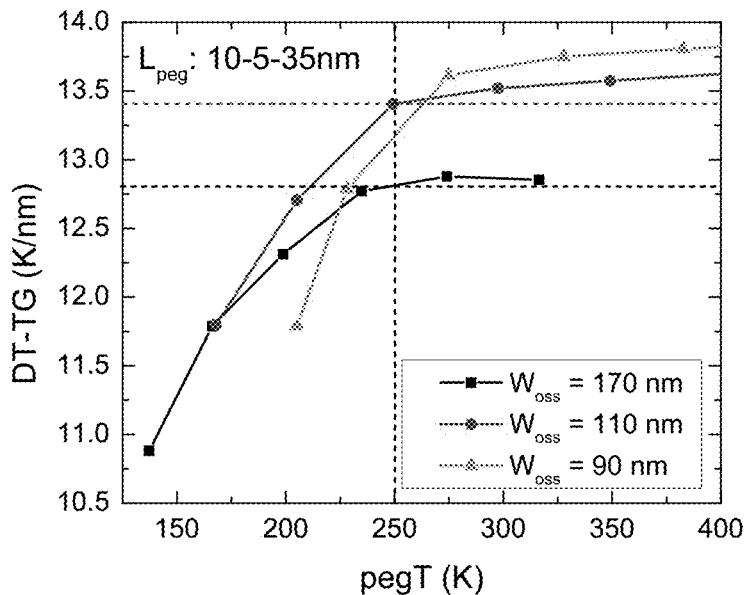
FIG. 15 is a graph showing simulation results of a near-field transducer as shown in FIG. 14.

In FIG. 15, a graph shows the modeling result, based on the configuration of FIG. 14 with a bevel peg. In this modeling, the dimension of the first surface-plasmonic plate 220 is: thickness $H_{sp}$=NPS+10 nm=25 nm, width at the start $W_0$=350 nm, length $L_0$=935 nm, and 35 nm (=TPH–$L_{peg}$) recess from the large portion of the second surface-plasmonic plate 1400; the dimension of the second surface-plasmonic plate 1400 is: slant angle at the start $\theta_b$=30°, bevel angle $\theta_p$=30°, length $L_b$=210 nm, thickness $H_b$=60 nm, peg thickness $H_{peg}$=30 nm, and peg width $W_{peg}$=30 nm; the funnel coupler is: $\theta_{cp}$=45°, $t_{cp}$=30 nm, and $H_{cp}$=50 nm. Additional parameters are: CNS=15 nm and NPS=15 nm. Apparently this configuration yields better thermal gradient (along down-track direction) than the configuration of FIGS. 2-4 and FIGS. 8-9, resulting from the greater concentrated energy density over the peg. The cross-section area of the peg at media-facing surface is also ~50% larger and the writing position is about 35 nm closer to the magnetic pole.

In summary, a dielectric separates a ridge from a metallic base in C-aperture near the media-facing surface leading to two near-field transducer schemes with high thermal gradient. One scheme has the $E_y$ component concentration at the gap between the ridge (peg) and the bottom metal and the other one has the $E_y$ component concentrated at the gap between the ridge and the diffusion barrier/magnetic pole, the dielectric gap (NPS). The first surface-plasmon plate might be removed to maximize the heat-transfer from the second surface-plasmon plate to the heat-spreading layer and the magnetic pole.

Figure 16:
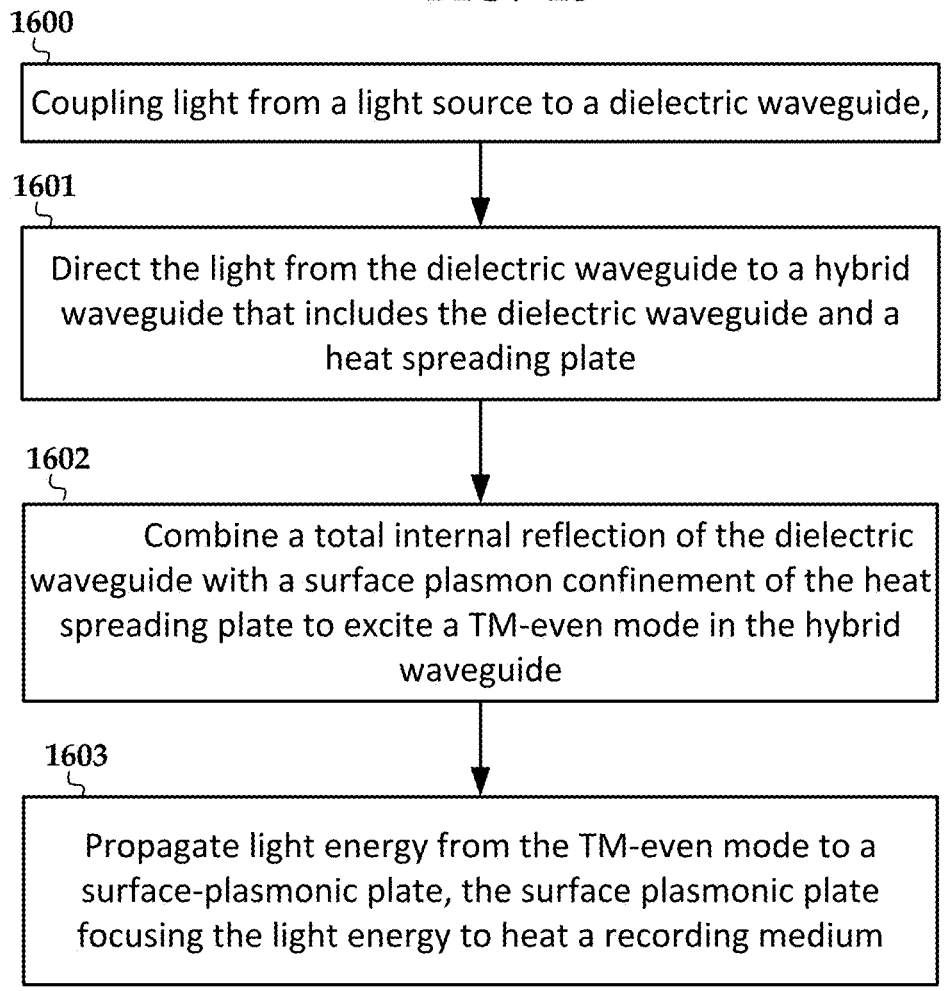
FIG. 16 is a flowchart of a method according to an example embodiment.

In FIG. 16, a flowchart shows a method according to an example embodiment. The method involves coupling 1600 light from a light source to a dielectric waveguide. The dielectric waveguide directs 1601 the light to a hybrid waveguide that includes the dielectric waveguide and a heat spreading plate. In response to the directing of the light to the hybrid waveguide, a total internal reflection of the dielectric waveguide is combined 1602 with a surface plasmon confinement of the heat spreading plate to excite a TM-even mode (in some cases together with a TM-odd mode) in the hybrid waveguide. Light energy propagates 1603 from the TM-even mode to a surface-plasmonic plate. The surface plasmonic plate is in contact with the heat spreader and includes a peg extending from an enlarged portion. The surface plasmonic plate focuses the light energy from the peg to heat a recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a waveguide core;
   a magnetic pole; and
   a first surface-plasmonic plate proximate the magnetic pole and recessed from a media-facing surface of the write head, a bottom surface of the first surface-plasmonic plate facing away from the magnetic pole and towards the waveguide core, the first surface-plasmonic plate formed of a first material having lower-loss in plasmonic coupling than a second material, the second material being more mechanically robust than the first material;
   a second surface-plasmonic plate formed of the second material and located on the bottom surface of the first surface-plasmonic plate, the second surface-plasmonic plate comprising a peg extending from an enlarged portion, the peg extending closer to the media-facing, surface than the first surface-plasmonic plate, an upper edge of the second surface-plasmonic plate slanted in a downtrack direction.

2. The recording head of claim 1, wherein the peg has a reduced downtrack thickness at an end facing the media-facing surface.

3. The recording head of claim 2, wherein the end of the peg facing the media-facing surface comprises an undercut that provides the reduced downtrack thickness.

4. The recording head of claim 2, wherein the end of the peg facing the media-facing surface comprises a bevel that provides the reduced downtrack thickness.

5. The recording head of claim 2, the reduced downtrack thickness is 30 nm or less.

6. The recording head of claim 1, wherein overlapping portions of the first and second surface-plasmonic plates have a same in-plane crosstrack edge shape.

7. The recording head of claim 1, wherein the first material comprises at least one of Au, Ag, Cu, and alloys thereof.

8. The recording head of claim 1, wherein the second material comprises at least one of Rh, Ir, Pt, Pd, and alloys thereof.

9. The recording head of claim 1, further comprising first and second optical side shields on first and second crosstrack sides of the first and second surface-plasmonic plates, the first and second optical side shields elongated and slanted relative to the media-facing surface in a crosstrack direction.

10. The recording head of claim 1, wherein the waveguide core narrows in a crosstrack direction as it approaches the media-facing surface.

11. The recording head of claim 1, wherein a terminating edge of the waveguide core has a slanted surface that faces away from the write pole, the recording head further comprising a funnel coupler spaced away from the slanted surface and having a reflective surface parallel to the slanted surface.

12. A recording head, comprising:
    a dielectric waveguide that receives light from a light source, the dielectric waveguide extending towards a media-facing surface of the recording head;
    a magnetic pole;

a hybrid waveguide near the media-facing surface, the hybrid waveguide comprising the dielectric waveguide and a heat spreader plate having a crosstrack dimension that is at least twice that of a core of the dielectric waveguide, the heat spreader plate thermally coupled to the write pole, the hybrid waveguide operable to combine a total internal reflection of the dielectric waveguide with a surface plasmon confinement of the heat spreading plate to excite TM-even mode in the hybrid waveguide; and a surface-plasmonic plate in contact with the heat spreader plate, the second surface-plasmonic plate comprising a peg extending from an enlarged portion, light energy from the TM-even mode propagating from the hybrid waveguide to the surface-plasmonic plate causing the surface plasmonic plate to focus the light energy to heat a recording medium.

13. The recording head of claim 1, wherein the heat spreading plate is formed of a first material and the surface-plasmonic plate is formed of a second material, the first material having lower-loss in plasmonic coupling than the second material, the second material being more mechanically robust than the first material.

14. The recording head of claim 13, wherein first material comprises at least one of Au, Ag, Cu, and alloys thereof.

15. The recording head of claim 13, wherein the second material comprises at least one of Rh, Ir, Pt, and Pd.

16. The recording head of claim 13, further comprising first and second optical side shields on first and second crosstrack sides of the first and second surface-plasmonic plates, the first and second optical side shields elongated and slanted relative to the media-facing surface in a crosstrack direction.

17. The recording head of claim 13, wherein the waveguide core narrows in a crosstrack direction as it approaches the media-facing surface.

18. The recording head of claim 13, wherein a terminating edge of the waveguide core has a slanted surface that faces away from the write pole, the recording head further comprising a funnel coupler spaced away from the slanted surface and having a reflective surface parallel to the slanted surface.

19. A method comprising:
coupling light from a light source to a dielectric waveguide, the dielectric waveguide directing the light to a hybrid waveguide comprising the dielectric waveguide and a heat spreading plate;

in response to the directing of the light to the hybrid waveguide, combining a total internal reflection of the dielectric waveguide with a surface plasmon confinement of the heat spreading plate to excite a TM-even mode in the hybrid waveguide; and propagating light energy from the TM-even mode to a surface-plasmonic plate, the surface plasmonic plate being in contact with the heat spreader and comprising a peg extending from an enlarged portion, the surface plasmonic plate focusing the light energy from the peg to heat a recording medium.

20. The method of claim 19, wherein a narrowing of a crosstrack dimension of the surface-plasmonic plate cuts off a TM-odd mode that is generated together with the TM-even mode in the hybrid waveguide and performs plasmonic nanofocusing for the TM-even mode.

* * * * *